United States Patent
Kopf et al.

(10) Patent No.: US 8,489,331 B2
(45) Date of Patent: Jul. 16, 2013

(54) DESTINATION MAPS USER INTERFACE

(75) Inventors: Johannes P. Kopf, Redmond, WA (US); Michael F. Cohen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 352 days.

(21) Appl. No.: 12/770,381

(22) Filed: Apr. 29, 2010

(65) Prior Publication Data

US 2011/0270516 A1 Nov. 3, 2011

(51) Int. Cl.
*G08G 1/123* (2006.01)

(52) U.S. Cl.
USPC .......................................... 701/532; 701/426

(58) Field of Classification Search
USPC .................. 701/425, 426, 430, 532; 345/629
See application file for complete search history.

(56) References Cited

U.S. PATENT DOCUMENTS

| | | | |
|---|---|---|---|
| 3,770,347 A | 11/1973 | Ambrose et al. | |
| 5,910,803 A | 6/1999 | Grau et al. | |
| 5,913,918 A | 6/1999 | Nakano et al. | |
| 6,271,843 B1 | 8/2001 | Lection et al. | |
| 6,282,493 B1 | 8/2001 | Kitagawa et al. | |
| 6,321,158 B1 * | 11/2001 | DeLorme et al. | 701/426 |
| 6,424,933 B1 | 7/2002 | Agrawala et al. | |
| 6,668,226 B2 | 12/2003 | Sutanto | |
| 6,952,647 B2 | 10/2005 | Hasegawa et al. | |
| 6,952,661 B2 | 10/2005 | Agrawala et al. | |
| 7,076,409 B2 | 7/2006 | Agrawala et al. | |
| 7,158,878 B2 * | 1/2007 | Rasmussen et al. | 701/431 |
| 7,268,789 B2 | 9/2007 | Cabral et al. | |
| 7,330,787 B2 | 2/2008 | Agrawala et al. | |
| 7,392,133 B2 | 6/2008 | Maruyama et al. | |
| 7,437,279 B2 | 10/2008 | Agrawala et al. | |
| 7,458,029 B2 | 11/2008 | Agrawala et al. | |
| 7,467,356 B2 | 12/2008 | Gettman et al. | |
| 7,496,484 B2 | 2/2009 | Agrawala et al. | |
| 7,523,405 B2 | 4/2009 | Robertson et al. | |
| 7,542,882 B2 | 6/2009 | Agrawala et al. | |
| 7,715,980 B2 | 5/2010 | Bargeron et al. | |
| 7,751,968 B2 * | 7/2010 | Yamada et al. | 701/426 |

(Continued)

FOREIGN PATENT DOCUMENTS

| | | |
|---|---|---|
| EP | 1508780 | 2/2005 |
| EP | 1555512 | 7/2005 |

(Continued)

OTHER PUBLICATIONS

Dixon, et al., "iGO 2006—Let the Games Begin", Retrieved at << http://www.pocketgpsworld.com/iGo2006.php >>, Jun. 15, 2006, pp. 13.

(Continued)

*Primary Examiner* — Helal A Algahaim
(74) *Attorney, Agent, or Firm* — Wolfe-SBMC

(57) ABSTRACT

A user interface is presented via which user inputs can be received and maps can be displayed. A user selection of a destination and a user specification of a region of interest on a map are received. The region of interest surrounds the destination on the map. In response to receiving the user specification of the region of interest, a destination map is displayed via the user interface. The destination map includes both the destination and the region of interest, and a layout of one or more roads that include one or more routes to the destination at multiple different scales.

20 Claims, 11 Drawing Sheets

U.S. PATENT DOCUMENTS

| | | | |
|---|---|---|---|
| 8,204,684 B2* | 6/2012 | Forstall et al. | 701/433 |
| 2002/0156739 A1* | 10/2002 | Hirai et al. | 705/52 |
| 2005/0140524 A1 | 6/2005 | Kato et al. | |
| 2005/0182604 A1 | 8/2005 | Agrawala et al. | |
| 2006/0058947 A1 | 3/2006 | Schalk | |
| 2007/0106466 A1* | 5/2007 | Noguchi | 701/209 |
| 2007/0112507 A1 | 5/2007 | Bargeron et al. | |
| 2007/0129082 A1 | 6/2007 | Thacher | |
| 2008/0033641 A1* | 2/2008 | Medalia | 701/209 |
| 2008/0068380 A1* | 3/2008 | McAvoy et al. | 345/428 |
| 2008/0243374 A1* | 10/2008 | Hatazawa | 701/208 |
| 2009/0037090 A1* | 2/2009 | Kanematsu | 701/200 |
| 2009/0112455 A1* | 4/2009 | Bohannon et al. | 701/200 |
| 2009/0167787 A1 | 7/2009 | Bathiche et al. | |
| 2010/0063721 A1* | 3/2010 | Won | 701/201 |
| 2010/0094548 A1* | 4/2010 | Tadman et al. | 701/209 |
| 2010/0162091 A1* | 6/2010 | Yepez | 715/201 |
| 2010/0228436 A1* | 9/2010 | Nezu et al. | 701/36 |
| 2011/0004822 A1* | 1/2011 | Nezu et al. | 715/702 |
| 2011/0096091 A1* | 4/2011 | Milewski et al. | 345/629 |

FOREIGN PATENT DOCUMENTS

| | | |
|---|---|---|
| JP | 07168995 | 7/1995 |
| JP | 10307533 | 11/1998 |
| JP | 11271068 | 10/1999 |
| JP | 2002206938 | 7/2002 |
| JP | 2003203085 | 7/2003 |
| JP | 2005181049 | 7/2005 |
| JP | 2005292030 | 10/2005 |
| KR | 20030037453 | 5/2003 |
| WO | WO-03107312 | 12/2003 |
| WO | WO-2005020187 | 3/2005 |
| WO | WO-2005093372 | 10/2005 |

OTHER PUBLICATIONS

Shrestha, Ayush Y., "Making Sense of Geographic Data with Dundas Map and AJAX", Retrieved at << http://www.codeproject.com/showcase/DundasMap_AJAX.asp >>, Oct. 12, 2006, pp. 4.

"European Search Report", European Application No. 06838037.7, (Aug. 2, 2011), 15 pages.

"Foreign Notice of Allowance", Chinese Application No. 200680043090.6, (Apr. 22, 2010), 2 pages.

"Foreign Office Action", Chinese Application No. 200680043090.6, (Jun. 26, 2009), 10 pages.

"Foreign Office Action", European Application No. 06838037.7, (Jun. 26, 2012), 6 pages.

"Foreign Office Action", Japanese Application No. 2008-541399, (Apr. 30, 2010), 10 pages.

"Foreign Office Action", Japanese Application No. 2008-541399, (Aug. 13, 2010), 9 pages.

"Foreign Office Action", Japanese Application No. 2008-541399, (Feb. 8, 2011), 10 pages.

"International Search Report and Written Opinion", PCT Application No. PCT/US2006/044858, (Apr. 16, 2007), 10 pages.

"Non-Final Office Action", U.S. Appl. No. 11/420,550, (Sep. 21, 2009), 6 pages.

"Notice of Allowance", U.S. Appl. No. 11/420,550, (Jan. 27, 2010), 6 pages.

Agrawala, Maneesh et al., "Rendering Effective Route Maps: Improving Usability Though Generalization", *Proceedings of ACM SIGGRAPH 2001*, pp. 241-250, (2001), 10 pages.

Christensen, Jon et al., "An Empirical Study of Algorithms for Point-Feature Label Placement", *ACM Transactions on Graphics*, pp. 203-232, (1995), 23 pages.

De Berg, Mark et al., "Computational Geometry: Algorithms and Applications", *Third Edition, 3rd Revised Edition, Springer-Verlag Publishers*, ISBN: 978-3-540-77973-5, (2008), 53 pages.

Edmondson, Shawn et al., "A General Cartographic Labeling Algorithm", *Mitsubishi Electric Research Laboratories, Technical Report TR96-04*, Cambridge, MA, (Dec. 1996), 21 pages.

Imhof, Eduard "Positioning Names on Maps", *The American Cartographer*, vol. 2, No. 2, (1975), pp. 128-144.

"Foreign Office Action", Korean Application No. 10-2008-7011847, (Dec. 20, 2012), 4 pages.

* cited by examiner

200

DESTINATION MAPS USER INTERFACE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Computer generated maps oftentimes display a portion of the earth and/or a road network laid out to scale. Users can sometimes change this scale, but any map resulting from such a change is still displayed in a single scale. Such maps can be problematic for users because they oftentimes provide too much detail in certain areas and/or insufficient detail in other areas.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a user selection of a destination is received via a user interface. Additionally, a user specification of a region of interest on a map is received. The region of interest surrounds the destination on the map. In response to receiving the user specification of the region of interest, a destination map is displayed via the user interface. The destination map includes both the destination and the region of interest, and a layout of one or more roads that include one or more routes to the destination at multiple different scales.

BRIEF DESCRIPTION OF THE DRAWINGS

The same numbers are used throughout the drawings to reference like features.

DETAILED DESCRIPTION

A destination maps user interface is discussed herein. A user interface is presented to a user, allowing the user to identify various parameters for a destination map. The destination map is a map that includes a layout of one or more roads that include one or more routes to a destination at multiple different scales. The user interface allows the user to input a selection of a destination, as well as specify a region of interest. The region of interest indicates the area around the selected destination that is to be included in the destination map. The user interface also allows the user to input a title for the map, and indicate one or more different styles to be used to display the map. The user interface can also allow the user to save or share the map for subsequent retrieval by the user or by others.

Figure 1:
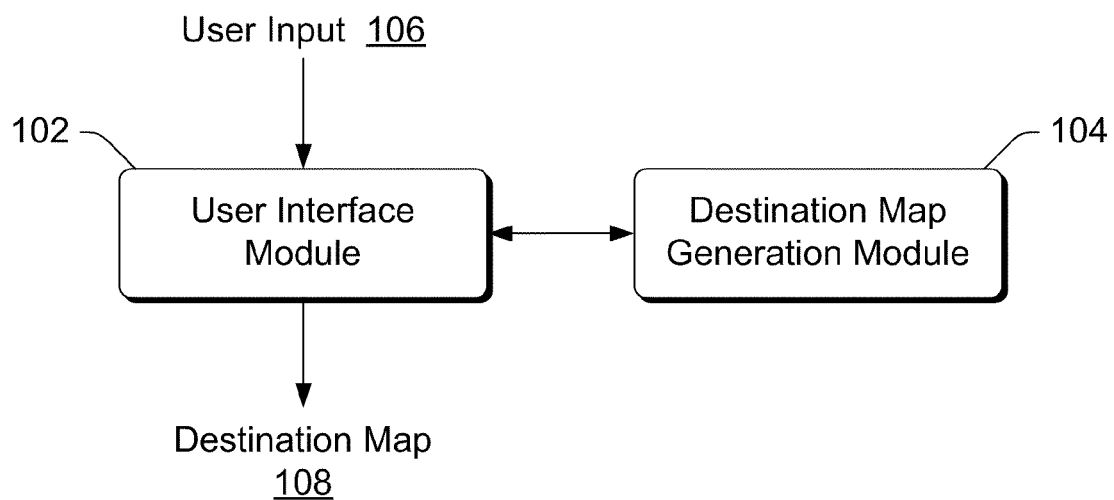
FIG. 1 illustrates an system implementing the destination maps user interface in accordance with one or more embodiments.

FIG. 1 illustrates an system 100 implementing the destination maps user interface in accordance with one or more embodiments. System 100 includes a user interface module 102 and a destination map generation module 104. User interface module 102 and destination map generation module 104 can be implemented in a variety of different types of computing devices, such as a desktop computer, a server computer, a mobile station, an entertainment appliance, a set-top box communicatively coupled to a display device, a television, a cellular or other wireless phone, a handheld or notepad computer, an audio and/or video playback device, a game console, an automotive computer, and so forth. User interface module 102 and destination map generation module 104 can be implemented by the same computing device. Alternatively, user interface module 102 and destination map generation module 104 can be implemented by different computing devices, and can be implemented by the same or different types of computing devices. For example, user interface module 102 can be implemented on a user's computing device, and destination map generation module 104 can be implemented on a server device that the user's computing device accesses.

In situations where user interface module 102 and destination map generation module 104 are implemented by different computing devices, the different computing devices can communicate with one another. Such communication can be via a direct connection (e.g., a wired or wireless connection) or via a variety of different networks, including the Internet, a local area network (LAN), a public telephone network, an intranet, other public and/or proprietary networks, combinations thereof, and so forth.

User interface module 102 displays or otherwise presents a user interface to a user of system 100, displaying information to the user and receiving user input 106 from the user. User input 106 can be received in a variety of different manners, such as alphanumeric inputs received via a keyboard or touchpad, verbal inputs received via a microphone, dragging or directional inputs received via a cursor control device or motions (e.g., finger or stylus) on a touchpad or touchscreen, activation of a button by pressing or clicking on the button, and so forth. User input 106 identifies various parameters for a destination map, including both a destination and a region of interest for the destination map as discussed in more detail below.

User interface module 102 provides user input 106 to destination map generation module 104. Destination map generation module 104 generates a destination map based on user input 106, and returns the generated destination map to user interface module 102. Alternatively, destination map generation module 104 can store the destination map at a particular location (e.g., on a particular device) and provide an indication to user interface module 102 of that particular location. This indication can be, for example, a link or address of the particular location where the destination map is stored, such as a Uniform Resource Locator (URL) of the particular location.

In one or more embodiments, user interface module 102 receives the destination map from destination map generation module 104 and displays the destination map as destination map 108 to the user of system 100. User input 106 can also include a user selection of one of multiple different map styles in which the destination map is to be displayed. In response to such a user selection, user interface module 102 displays destination map 108 in the selected map style.

The destination map generated by destination map generation module 104 is a map that includes both a destination and a region of interest specified by the user as user inputs 106. The destination map includes a layout of one or more roads that include one or more routes to the destination. The layout of roads typically includes a hierarchy of roads, which includes roads of different sizes and/or importance (such as highways, major arterials, two-lane roads, and so forth). The destination map includes multiple different scales, with portions of the destination map that are closer to the destination being displayed with a smaller scale than portions of the destination map that are further from the destination. The smaller the scale of a portion of the destination map, the more detail that is displayed in that portion of the destination map. Thus, the destination map includes more detail (e.g., more smaller roads and/or roads of lesser importance) closer to the destination than further away from the destination.

The destination map can be generated in a variety of different manners. In one or more embodiments, the destination map is generated using techniques discussed in U.S. patent application Ser. No. 11/420,550, to Bargeron et al., titled "Schematic Destination Maps". U.S. patent application Ser. No. 11/420,550 is hereby incorporated by reference herein.

Figure 2:
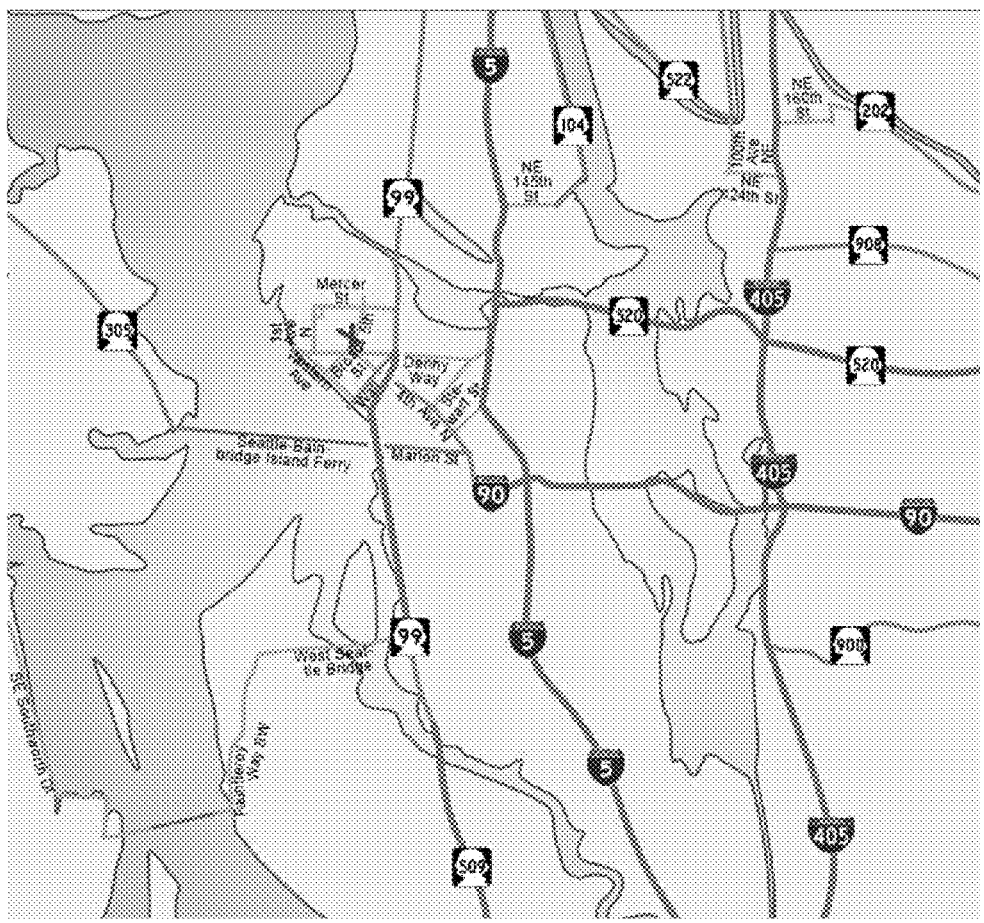
FIG. 2 illustrates an destination map in accordance with one or more embodiments.

FIG. 2 illustrates an destination map 200 in accordance with one or more embodiments. Destination map 200 is generated based at least in part on the techniques discussed herein. In the destination map 200, the destination is marked by an "X". A hierarchy of roads is displayed, including highways (e.g., Interstate 5), and smaller roads (e.g. Mercer St.). Destination map 200 includes more detail (e.g., displays smaller roads and names of smaller roads) close to the destination, but less detail (e.g., no information regarding smaller roads) further from the destination.

Figure 3:
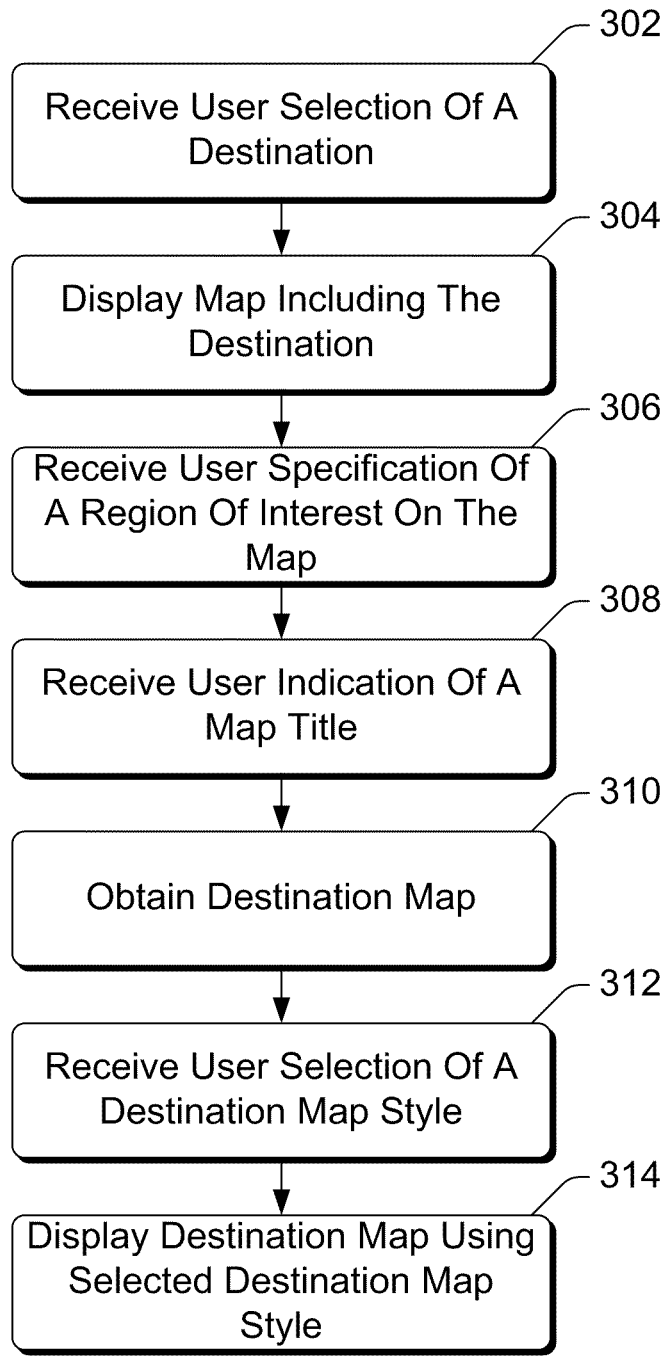
FIG. 3 is a flowchart illustrating an process for using a destination maps user interface in accordance with one or more embodiments.

FIG. 3 is a flowchart illustrating an process 300 for using a destination maps user interface in accordance with one or more embodiments. Process 300 is carried out by a user interface module, such as user interface module 102 of FIG. 1, and can be implemented in software, firmware, hardware, or combinations thereof. Process 300 is shown as a set of acts and is not limited to the order shown for performing the operations of the various acts. Process 300 is an example process for using a destination maps user interface; additional discussions of using a destination maps user interface are included herein with reference to different figures.

In process 300, a user selection of a destination is received (act 302). The user selection of a destination can be received in a variety of different manners. In one or more embodiments, the user selection of a destination is a user input of a particular description of the destination, such as a street address, global positioning system (GPS) coordinates, and so forth. If multiple destinations correspond to the user input (for example, a street address is input without a city or zip code), the user can be prompted to select one of the multiple destinations that correspond to the user input. Alternatively, the user can be prompted to take different actions, such as to input additional information. In other embodiments, the user selection of a destination is a user input dragging and dropping an icon (such as a flag or a star) to a particular location on a map. The particular location where the icon is dropped is the destination selected by the user.

Figure 4:
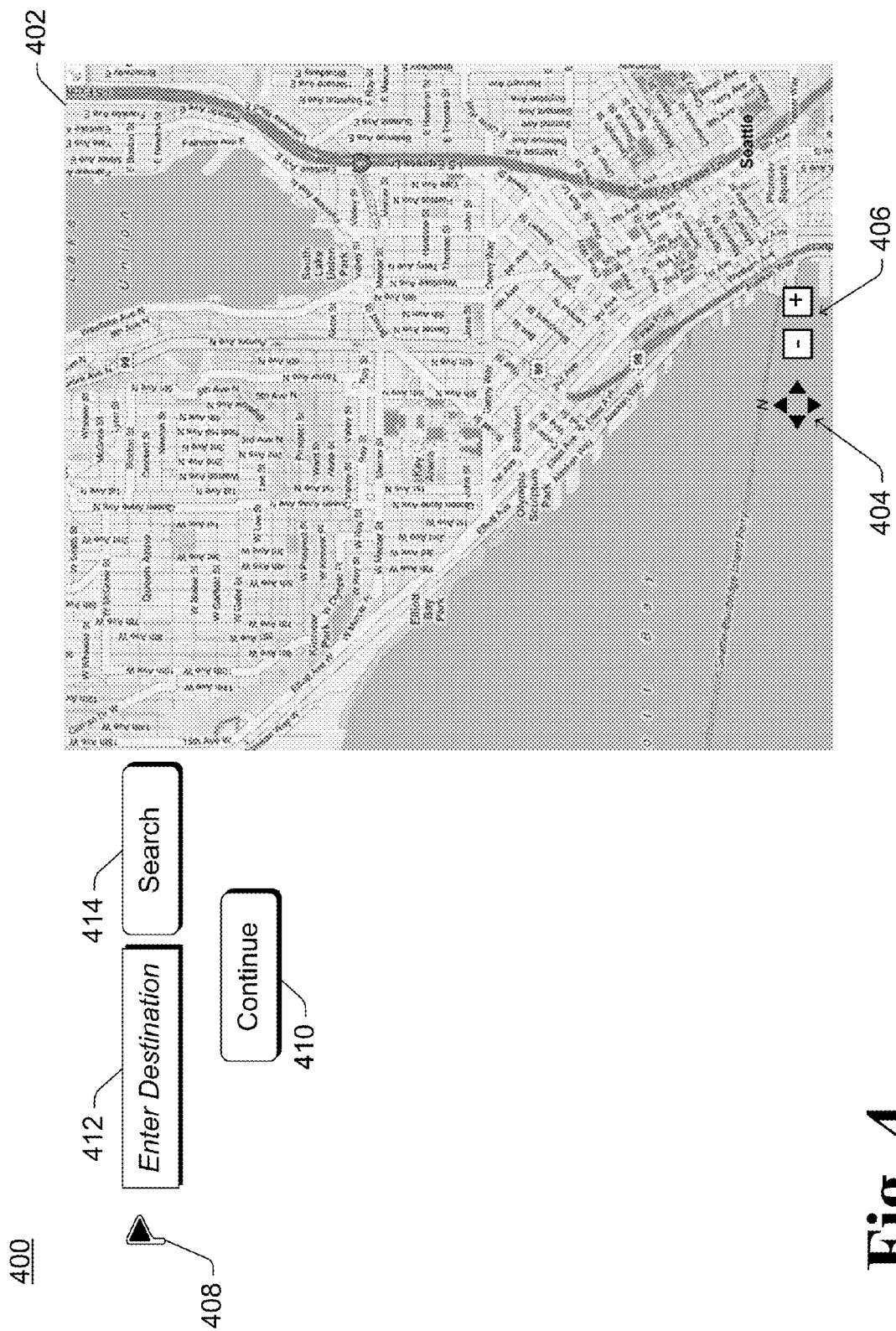
FIG. 4 illustrates an user interface supporting user selection of a destination in accordance with one or more embodiments.

FIG. 4 illustrates an user interface 400 supporting user selection of a destination in accordance with one or more embodiments. In FIG. 4, a map 402 is displayed. It should be noted that map 402 is typically not (but alternatively could be) a destination map. The user can optionally scroll through map 402 (scrolling north, south, east, and/or west) by activating directional controls 404. The user can also optionally zoom in or zoom out map 402 using zoom controls 406 (e.g., activating the "−" button to zoom out and activating the "+" button to zoom in). Zooming in results in a finer scale and more detail, while zooming out results in a broader scale and less detail. Alternatively, the user can scroll through map 402 or zoom in or out map 402 via different user inputs.

A user can select a destination by dragging and dropping flag 408 on a particular location of map 402. After dropping flag 408, the user can optionally move flag 408 until he or she is satisfied with the location at which he or she has dropped flag 408. When the user is satisfied with the location at which he or she has dropped flag 408, the user can activate "continue" button 410. In response to activation of "continue" button 410, the location of flag 408 is used as the user selected destination.

An address or other coordinates (e.g., GPS coordinates) specifying the location where flag 408 is dropped can optionally be identified. Such an address or other coordinates can be determined by the user interface module, or alternatively by another component or module (such as destination map generation module 104 of FIG. 1).

Alternatively, rather than dragging and dropping flag 408, a user can input a description (e.g., a street address, GPS coordinates, etc.) of a destination by entering the description in data entry box 412. When the user has finished entering the description, the user can activate search button 414, causing the destination described by the user to be displayed on map 402. An icon, such as flag 408, can be displayed at the user described destination on map 402. The user can optionally enter different descriptions in data entry box 412 and activate search button 414 multiple times until he or she is satisfied with the description he or she has entered in data entry box 412. When the user is satisfied with the description that he or she has entered in data entry box 412, the user can activate "continue" button 410. In response to activation of "continue" button 410, the description entered in data entry box 412 is used as the user selected destination.

Returning to FIG. 3, a map including the destination is displayed (act 304). This map can be displayed while the user selection is made, such as in situations where a flag is dragged and dropped to a location on the map. Alternatively, this map can be displayed in response to the user selection being made, such as in situations where the user enters a description (e.g., a street address, GPS coordinates, etc.) of a destination in a data entry box.

A user specification of a region of interest surrounding the destination on the map displayed in act 304 is received (act 306). In one or more embodiments the region of interest is a rectangular region of interest, although alternatively the region of interest can be of other geometric shapes. A user can specify the region of interest in a variety of different manners, such as dragging one or more edges of a rectangle displayed on the map, using a scroll bar or wheel to increase or decrease the size of a rectangle displayed on the map, dragging and dropping a particular geometric shape of a particular size on the map, and so forth.

Figure 5:
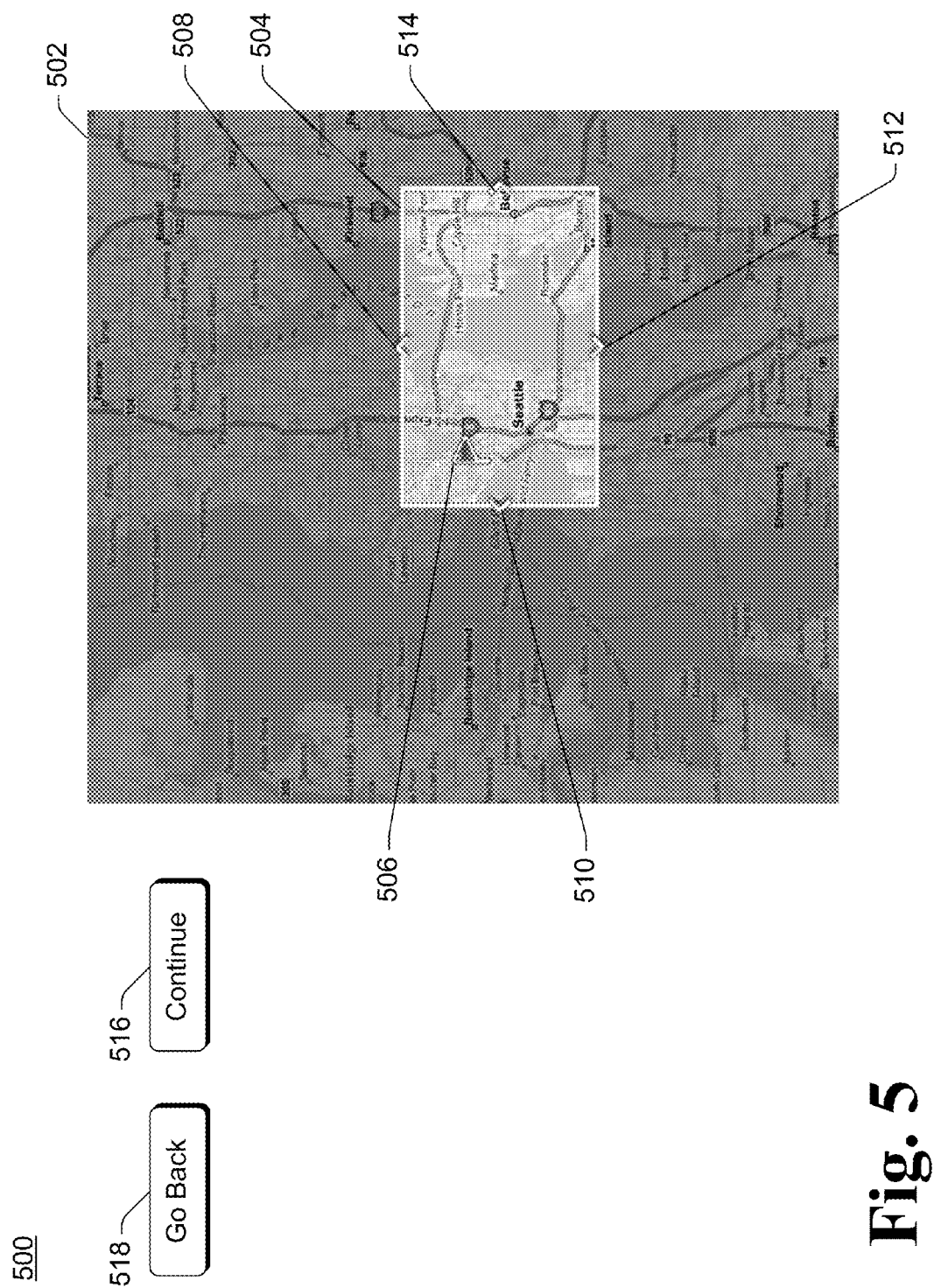
FIG. 5 illustrates an user interface supporting user specification of a region of interest in accordance with one or more embodiments.

FIG. 5 illustrates an user interface 500 supporting user specification of a region of interest in accordance with one or more embodiments. In FIG. 5, a map 502 is displayed. It should be noted that map 502 is typically not (but alternatively could be) a destination map. A rectangle 504 is displayed surrounding the destination (user selection of which was received in act 302 of FIG. 2). The destination is indicated by flag 506, although the destination can alternatively be called out in other manners. The initial size of rectangle 504 can be determined in different manners, such as being preconfigured in or otherwise accessed by the user interface module, being determined randomly, being determined according to other rules or criteria, and so forth.

One or more user inputs can also be received to adjust the size of rectangle 504. In one or more embodiments, directional icons 508, 510, 512, and 514 are displayed on the edges of rectangle 504. The user can drag a particular edge of rectangle 504 by selecting and dragging the directional icon 508, 510, 512, and 514 on that particular edge. The user can drag each edge inward (towards the destination), or outward (away from the destination) by the same or different amounts. In one or more embodiments the user interface module imposes a size constraint on the region of interest, in which case the edges can be dragged inward to an inner threshold and/or outward to an outer threshold.

The user can optionally drag different edges of rectangle 504 multiple times until he or she is satisfied with the size of rectangle 504. When the user is satisfied with the size of rectangle 504, the user can activate "continue" button 516 to confirm that rectangle 504 is the region of interest. In response to activation of "continue" button 516, rectangle 504 is used as the user specification of the region of interest. Alternatively, the user can return to change the destination by selecting "go back" button 518. In response to activation of "go back" button 518, a new user selection of a destination can be received (e.g., process 300 of FIG. 3 returns to act 302).

Returning to FIG. 3, a user indication of a title for the destination map is received (act 308). In one or more embodiments, the user interface module defaults to a map title that is a description of the destination (e.g., a street address, GPS coordinates, etc.). The user can accept this default map title, or alternatively enter his or her own map title.

Figure 6:
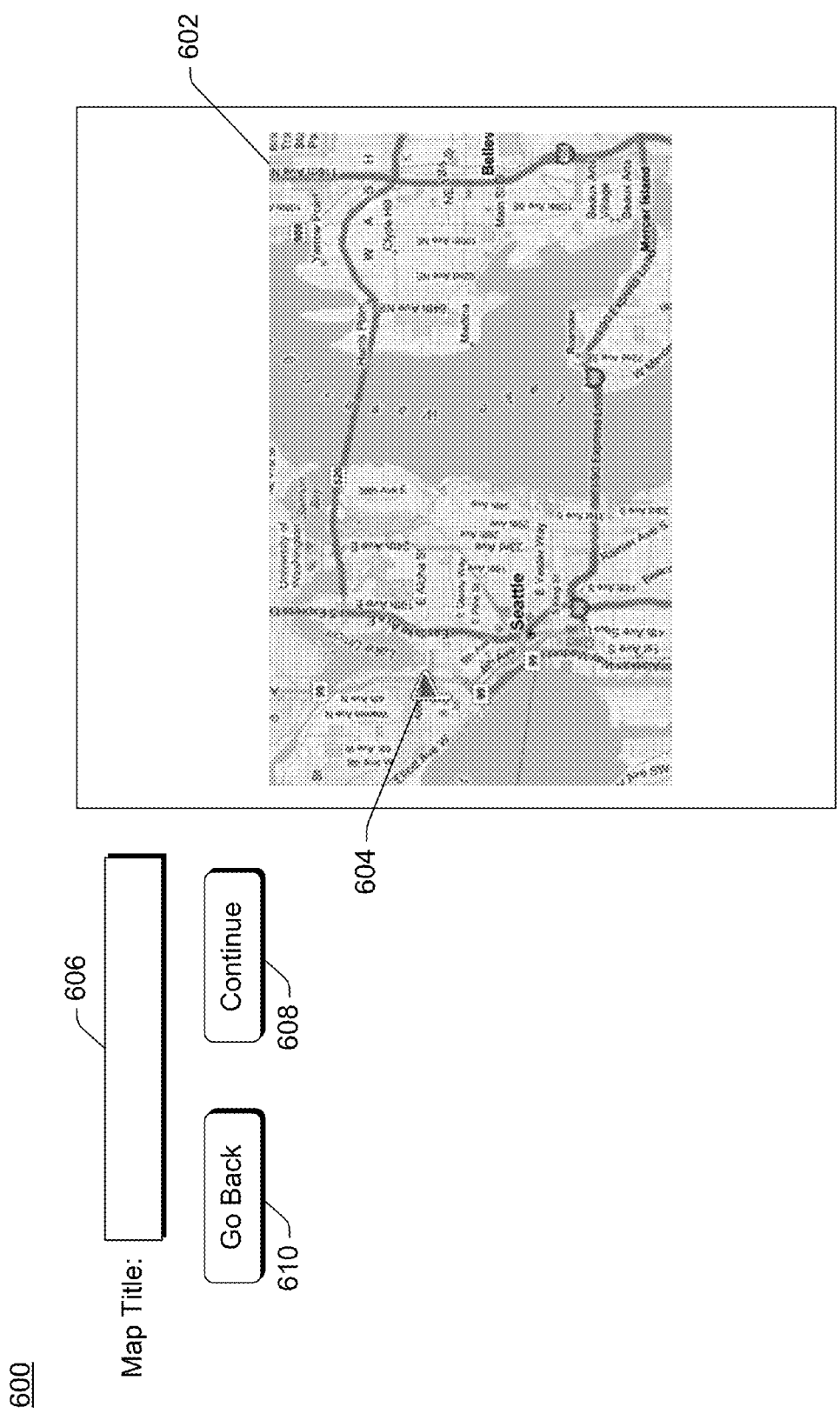
FIG. 6 illustrates an user interface supporting a user indication of a map title in accordance with one or more embodiments.

FIG. 6 illustrates an user interface 600 supporting a user indication of a map title in accordance with one or more embodiments. In FIG. 6, a map 602 is displayed. It should be noted that map 602 is typically not (but alternatively could be) a destination map. Map 602 includes the portion of map 502 of FIG. 5 that is within the region of interest specified by the user. Other portions of map 502 falling outside of the region of interest are not displayed in map 602. The destination is indicated by flag 604, although the destination can alternatively be called out in other manners.

A default map title can be displayed in data entry box 606, and the user can change the default map title by inputting the map title he or she desires in data entry box 606. The user can enter different map titles until he or she is satisfied with the map title. When the user is satisfied with the map title he or she has entered, or if the user is satisfied with the default map title, the user can activate "continue" button 608. In response to activation of "continue" button 608, the map title entered in data entry box 606 is used as the user indicated map title.

Alternatively, the user can return to change the region of interest by selecting "go back" button 610. In response to activation of "go back" button 610, a new user specification of a region of interest can be received (e.g., process 300 of FIG. 3 returns to act 306).

Returning to FIG. 3, a destination map is obtained (act 310) from a destination map generation module. The destination map is obtained in response to the user specification of a region of interest received in act 306 and/or a user indication of a map title received in act 308. The user interface module provides the destination, region of interest, and map title to the destination map generation module, which generates the destination map and returns the map (or an indication of where the map is stored) to the user interface module. The destination map generation module generates the destination map based at least in part on the destination and the region of interest provided by the user interface module. Additionally, a user selection of a destination map style is received (act 312). Different map styles can be used that display the destination map in different manners, such as displaying the destination map in a traditional road map style, in a hand-drawn sketch style, and so forth. The destination map is displayed using the user selected destination map style (act 314). Acts 312 and 314 can optionally be repeated multiple times, causing the destination map to be displayed using different destination map styles. In one or more embodiments, the destination map is displayed having the same aspect ratio as the region of interest specified in act 306.

In one or more embodiments, the destination map is not displayed until a destination map style is selected. In other embodiments, the destination map is displayed using a default destination map style which can be subsequently changed by the user selecting a different destination map style. The destination map is generated after user specification of the region of interest (and/or the user indication of the map title), and thus is displayed in response to user specification of the region of interest (and/or the user indication of the map title).

FIGS. 7, 8, 9, and 10 illustrate user interfaces supporting user selection of a destination map style in accordance with one or more embodiments. The user interfaces in FIGS. 7, 8, 9, and 10 are the same, except for the destination map style used to display the destination map.

Figure 7:
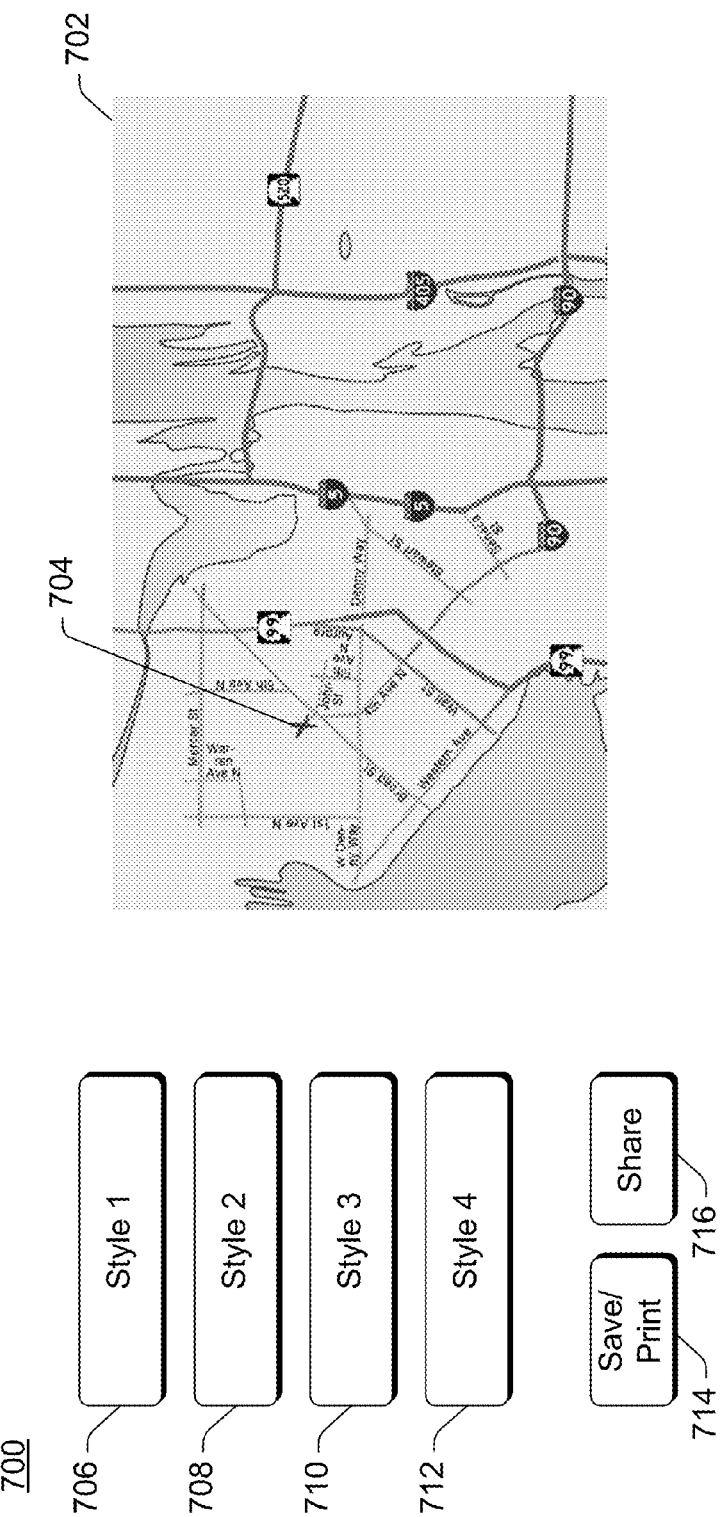
FIGS. 7, 8, 9, and 10 illustrate user interfaces supporting user selection of a destination map style in accordance with one or more embodiments.

In FIG. 7, a user interface 700 including a destination map 702 is displayed. Map 702 is a destination map generated based on the portion of map 502 of FIG. 5 that is within the region of interest specified by the user. The destination is indicated by "X" 704, although the destination can alternatively be called out in other manners.

Different destination map styles can be selected by the user activating different ones of destination map style buttons 706, 708, 710, and 712. In response to user activation of one of buttons 706, 708, 710, and 712, destination map 702 is displayed using the destination map style corresponding to the user activated button. In one or more embodiments an indication of the destination map style currently being used to display destination map 702 is indicated by altering the appearance of the corresponding destination map style button 706, 708, 710, and 712. For example, if the destination map style currently being used to display destination map 702 corresponds to destination map style button 706, then button 706 can be displayed with a different outline, with different coloring, with animation, and so forth.

Additionally, the user can request to save or print destination map 702 by activating "save/print" button 714, or share destination map 702 by activating "share" button 716. In response to user activation of "save/print" button 714, the user interface module saves destination map 702 to a particular storage location for subsequent retrieval by the user and/or prints destination map 702 to a particular printer. One or more additional windows or dialog boxes can be displayed to the user to allow the user to select the storage location where destination map 702 is to be stored and/or to select the printer to which destination map 702 is to be sent for printing. Alternatively, the user interface module can be configured with or otherwise have access to a default store location where destination map 702 is stored and/or a default printer to which destination map 702 is sent for printing.

In response to user activation of "share" button 716, the user interface module shares destination map 702 with other users. This sharing can take different forms, such as displaying a link (e.g., a URL) to a location where destination map 702 is stored so that the user can copy the link and provide the link to another component or module. This sharing can take other forms also, such as embedding or copying destination map 702 in or to a web page or web blog, publishing destination map 702 on a social networking site, sending an email or text message with a link (e.g., a URL) to a location where destination map 702 is stored, and so forth. One or more additional windows or dialog boxes can be displayed to the user to allow the user to select the manner in which destination map 702 is to be shared. Alternatively, the user interface module can be configured with or otherwise have access to a default manner in which destination map 702 is to be shared.

Although not illustrated in FIG. 7, it is to be appreciated that the title of the destination map (an indication of which was received in act 308 of FIG. 3) can be displayed with destination map 702. This title can be displayed in different manners, such as displayed as part of destination map 702, displayed above destination map 702, and so forth.

In one or more embodiments, the different destination map styles include a hand-drawn sketch style, one or more road map styles, and a treasure map style. Destination map 702 is an of a road map style.

Figure 8:
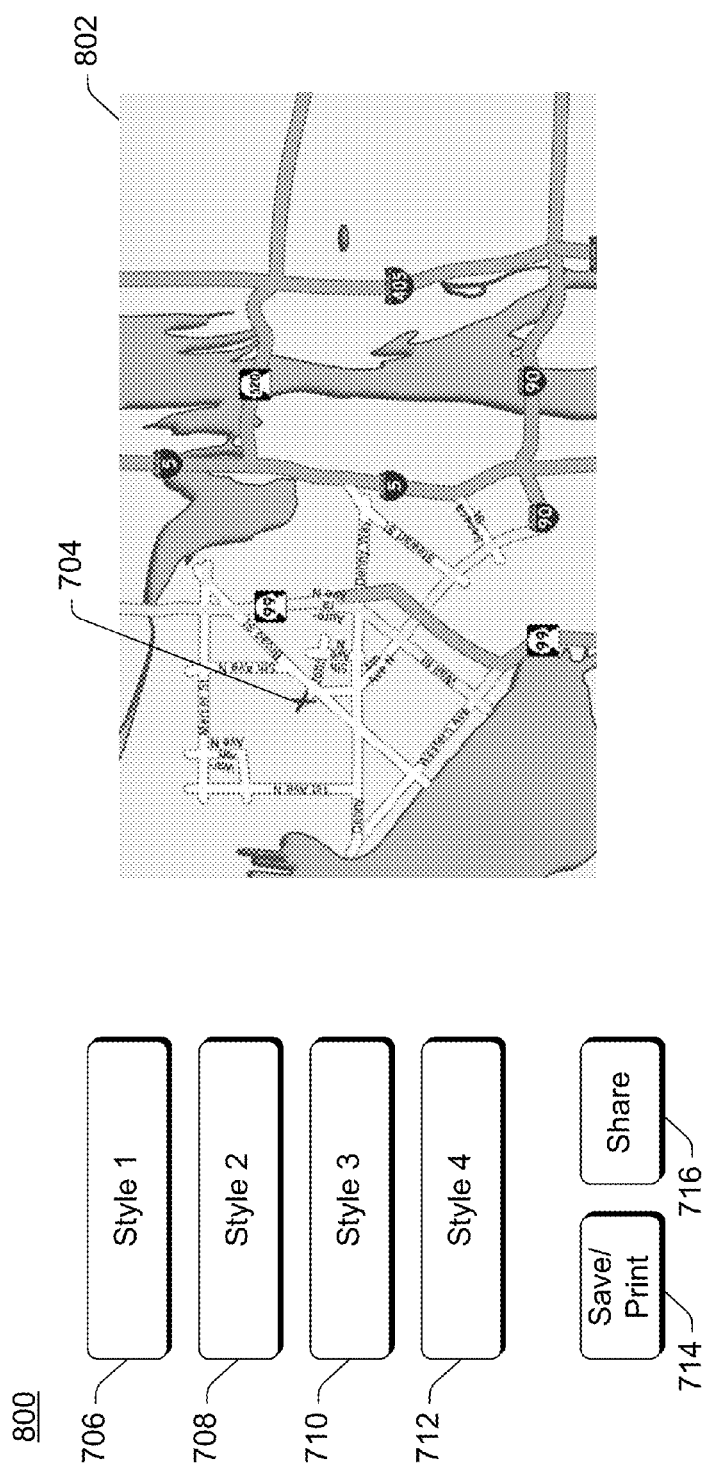

In FIG. 8, a user interface 800 includes a destination map 802 that is an of another road map style. The road map style of destination map 802 displays roads as wider and road names within the roads, whereas the road map style of destination map 702 displays roads as narrower and road names next to the roads.

Figure 9:
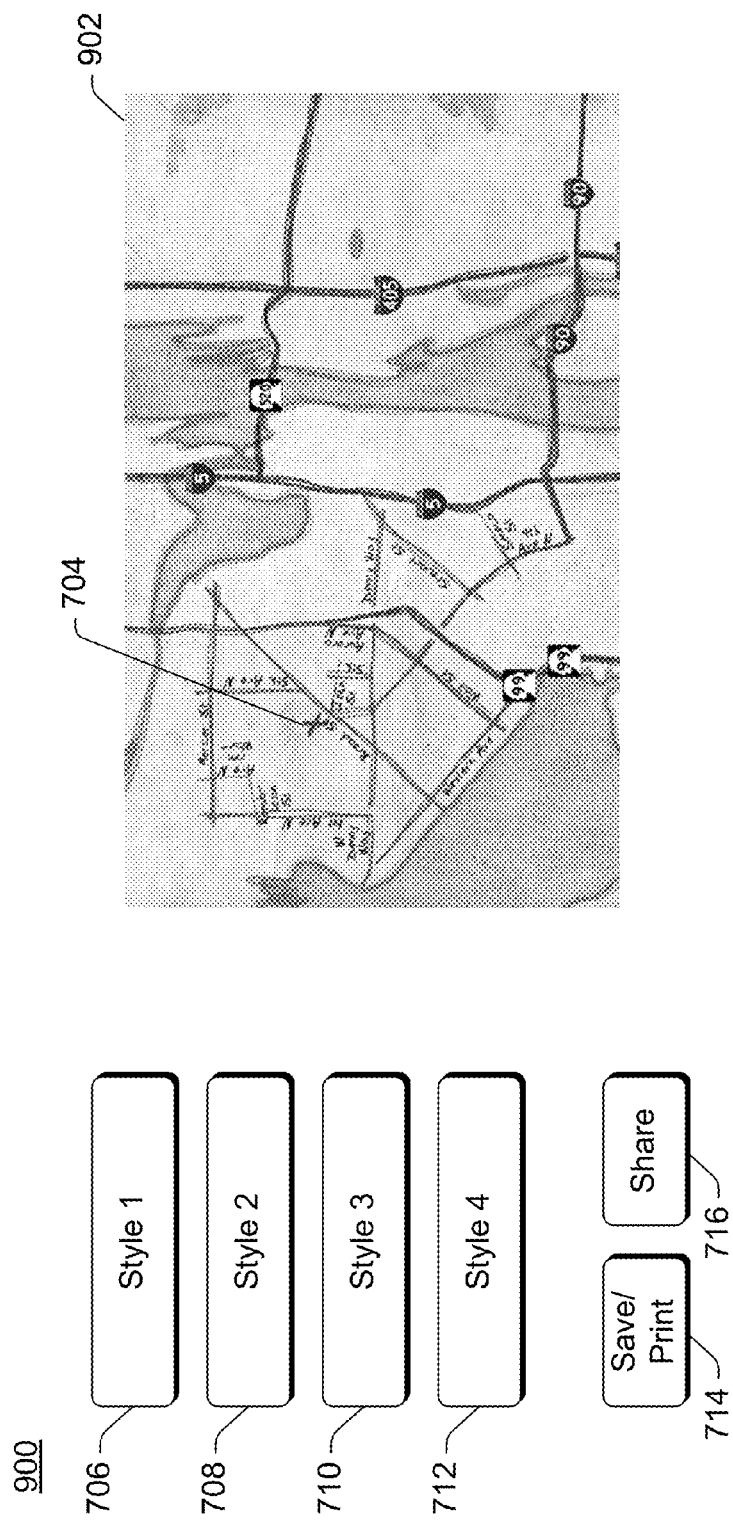

In FIG. 9, a user interface 900 includes a destination map 902 that is an of a hand-drawn sketch style. In the hand-drawn sketch style, roads are displayed to simulate the lines for the roads having been drawn by hand. A road is drawn using more lines (also referred to as being overdrawn) to indicate a larger or more important road. Larger and/or more important roads are drawn using more lines, whereas smaller and/or less important roads are drawn using fewer lines. The background of destination map 902 can also be changed to simulate a piece of paper (optionally with creases, stains, extraneous marks, and so forth).

Figure 10:
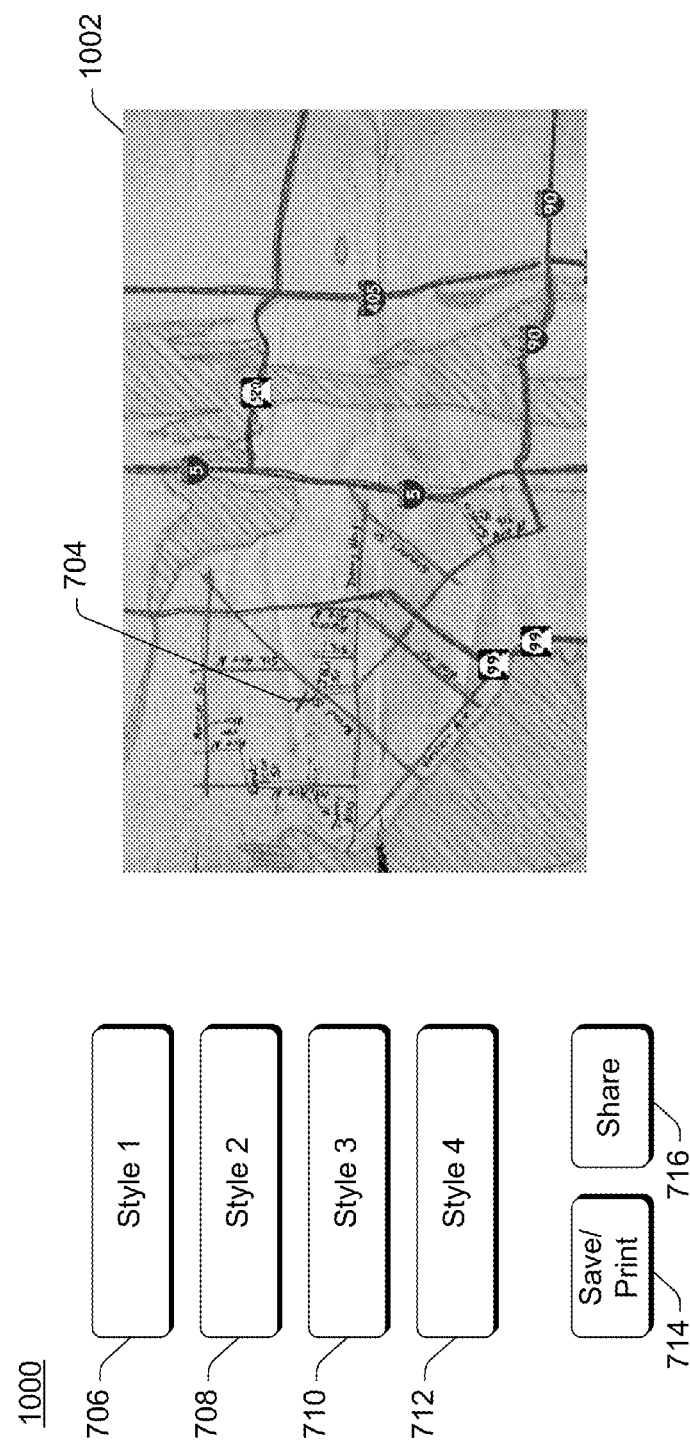

In FIG. 10, a user interface 1000 includes a destination map 1002 that is an of a treasure map style. In the treasure map style, roads are displayed to simulate the lines for the roads having been drawn by hand, analogous to the hand-drawn sketch style of destination map 902 of FIG. 9. The background of destination map 1002 is changed to simulate the color and look of an old treasure map, such as by giving the background an aged look (e.g., a yellow or orange shade), adding creases or stains to the background, displaying torn or burned edges or corners of the destination map, and so forth.

Returning to FIG. 3, it should be noted that one or more acts of process 300 need not be performed. For example, the destination map may not include a title, in which case no indication of the map title need be received in act 308. By way of another example, a destination map may be saved, printed, and/or shared without being displayed, in which case act 314 need not be performed.

Additionally, it should be noted that various additional user inputs can be received by the user interface module and used with the techniques discussed herein. In one or more embodiments, a user input can be received indicating that particular landmarks, particular types of buildings or landmarks, particular location names, and so forth be included in the destination map. In response to such a user input being received, the indicated items are included in the destination map by the destination map generation module. For example, a user input can be received indicating that a particular building (e.g., at a particular street address) be included in the destination map. By way of another example, a user input can be received indicating that city names and/or public parks that are within the user specified region of interest be included in the destination map.

In other embodiments, a user input can be received indicating that a particular one or more roads be included in (or alternatively excluded from) the destination map and/or be given preferential treatment in generating the destination map. In response to such a user input being received, the destination map generation module generates a destination map that includes (or alternatively excludes) the particular one or more roads, or favors including the particular one or more roads.

Figure 11:
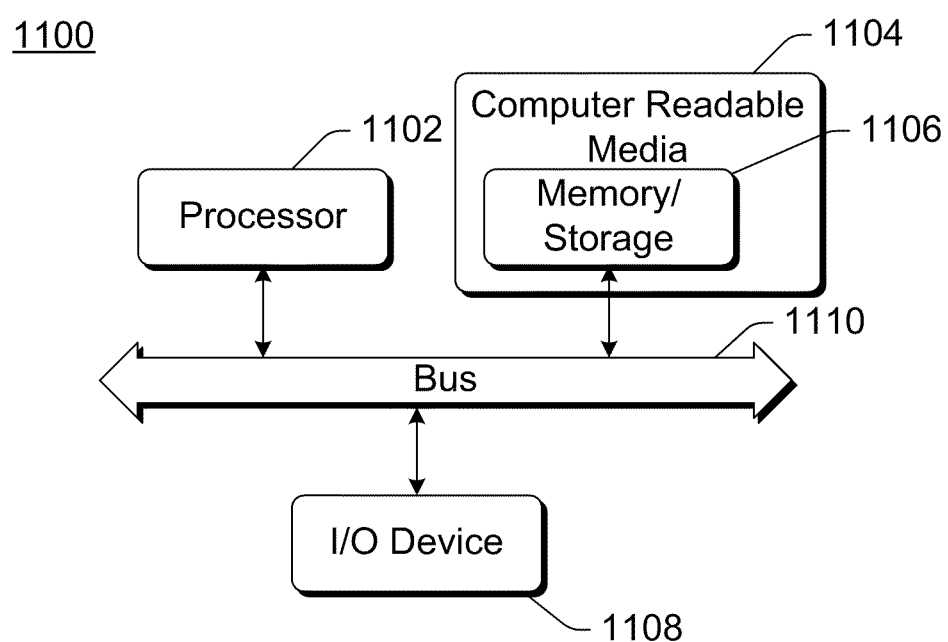
FIG. 11 illustrates an computing device that can be configured to implement the destination maps user interface in accordance with one or more embodiments.

FIG. 11 illustrates an computing device 1100 that can be configured to implement the destination maps user interface in accordance with one or more embodiments. Computing device 1100 can implement, for example, user interface module 102 and/or destination map generation module 104 of FIG. 1.

Computing device 1100 includes one or more processors or processing units 1102, one or more computer readable media 1104 which can include one or more memory and/or storage components 1106, one or more input/output (I/O) devices 1108, and a bus 1110 that allows the various components and devices to communicate with one another. Computer readable media 1104 and/or one or more I/O devices 1108 can be included as part of, or alternatively may be coupled to, computing device 1100. Bus 1110 represents one or more of several types of bus structures, including a memory bus or memory controller, a peripheral bus, an accelerated graphics port, a processor or local bus, and so forth using a variety of different bus architectures. Bus 1110 can include wired and/or wireless buses.

Memory/storage component 1106 represents one or more computer storage media. Component 1106 can include volatile media (such as random access memory (RAM)) and/or nonvolatile media (such as read only memory (ROM), Flash memory, optical disks, magnetic disks, and so forth). Component 1106 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 1102. It is to be appreciated that different instructions can be stored in different components of computing device 1100, such as in a processing unit 1102, in various cache memories of a processing unit 1102, in other cache memories of device 1100 (not shown), on other computer readable media, and so forth. Additionally, it is to be appreciated that the location where instructions are stored in computing device 1100 can change over time.

One or more input/output devices 1108 allow a user to enter commands and information to computing device 1100, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 11. The features of the destination maps user interface techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as forms of implementing the claims.

What is claimed is:

1. A method implemented at a computing device, the method comprising:
    receiving, via a user interface module of the computing device, a user selection of a destination;
    displaying a map including the destination;
    receiving a user specification of a region of interest surrounding the destination on the map;
    in response to displaying the map and receiving the user specification of the region of interest, receiving user input to include or exclude particular content in the region of interest; and
    displaying, in response to receiving the user specification of the region of interest and receiving user input to include or exclude particular content in the region of interest, a destination map that includes both the destination and the region of interest, the destination map including a layout of one or more roads that include one or more routes to the destination at multiple different scales, the multiple different scales being displayed in a single window of the destination map at the same time.

2. The method as recited in claim 1, further comprising receiving a user indication of a map title for the destination map, and wherein the displaying further comprises displaying the destination map with the map title.

3. The method as recited in claim 1, further comprising receiving a user selection of a map style for the destination map, and wherein the displaying further comprises displaying the destination map in the selected map style.

4. The method as recited in claim 3, wherein the selected map style is one of multiple map styles that include a road map style, a hand-drawn sketch style, and a treasure map style.

5. The method as recited in claim 1, further comprising receiving a user request to save the destination map, and in response to the user request saving the destination map to a storage location.

6. The method as recited in claim 1, further comprising receiving a user request to share the destination map, and in response to the user request displaying a link to a location where the destination map is stored.

7. The method as recited in claim 1, wherein receiving a user selection of a destination comprises receiving a user input of a street address.

8. The method as recited in claim 1, wherein receiving a user selection of a destination comprises receiving a user input dragging and dropping a flag at the destination on the map.

9. The method as recited in claim 1, wherein receiving a user specification of a region of interest comprises receiving a user specification of a rectangle within which the destination is located.

10. The method as recited in claim 1, wherein receiving a user specification of a region of interest comprises:
    displaying a rectangle around the destination on the map;
    receiving one or more user inputs dragging one or more edges of the rectangle to different locations on the map; and
    receiving a user input confirming that the rectangle is the region of interest.

11. One or more computer hardware storage media having stored thereon multiple instructions that implement a user interface, wherein the multiple instructions when executed by one or more processors of a computing device cause the one or more processors to:
    receive, via the user interface, a user selection of a destination;

receive, via the user interface, a user specification of a region of interest on a map surrounding the destination on the map;

receive, via the user interface, user input to include or exclude particular content in the region of interest; and display, via the user interface and in response to receiving the user specification of the region of interest, a destination map that includes both the destination and the region of interest, the destination map including a layout of one or more roads that include one or more routes to the destination at multiple different scales, the multiple different scales being displayed in a single window of the destination map at the same time.

12. The one or more computer hardware storage media as recited in claim 11, wherein the multiple instructions further cause the one or more processors to receive, via the user interface, a user indication of a map title for the destination map, and wherein to display the destination map is to display the destination map with the map title.

13. The one or more computer hardware storage media as recited in claim 11, wherein the multiple instructions further cause the one or more processors to receive, via the user interface, a user selection of a map style for the destination map, and wherein to display the destination map is to display the destination map in the selected map style.

14. The one or more computer hardware storage media as recited in claim 11, wherein the multiple instructions further cause the one or more processors to receive a user request to save the destination map, and in response to the user request save the destination map to a storage location.

15. The one or more computer hardware storage media as recited in claim 11, wherein the multiple instructions further cause the one or more processors to receive a user request to share the destination map, and in response to the user request display a link to a location where the destination map is stored.

16. The one or more computer hardware storage media as recited in claim 11, wherein to receive a user selection of a destination is to receive a user input of a street address.

17. The one or more computer hardware storage media as recited in claim 11, wherein to receive a user selection of a destination is to receive a user input dragging and dropping a flag at the destination on the map.

18. The one or more computer hardware storage media as recited in claim 11, wherein to receive a user specification of a region of interest is to receive a user specification of a rectangle within which the destination is located.

19. The one or more computer hardware storage media as recited in claim 11, wherein to receive a user specification of a region of interest is to:

display a rectangle around the destination on the map;

receive one or more user inputs dragging one or more edges of the rectangle to different locations on the map; and receive a user input confirming that the rectangle is the region of interest.

20. A method implemented at a computing device, the method comprising:

receiving, via a user interface module of the computing device, as a user selection of a destination, a user input dragging and dropping a flag on a map at the destination;

receiving a user specification of a region of interest surrounding the destination on the map, wherein receiving the user specification comprises:

displaying a rectangle around the destination on the map; and receiving one or more user inputs dragging one or more edges of the rectangle to different locations on the map;

receiving a user input to include or exclude particular content in the region of interest;

receiving a user selection of one of multiple map styles; and displaying, in response to receiving the user selection of one of the multiple map styles, a destination map in the user selected map style, the destination map including the destination, the region of interest, and a layout of one or more roads including one or more routes to the destination at multiple different scales, the multiple different scales being displayed in a single window of the destination map at the same time.

* * * * *